UNITED STATES PATENT OFFICE.

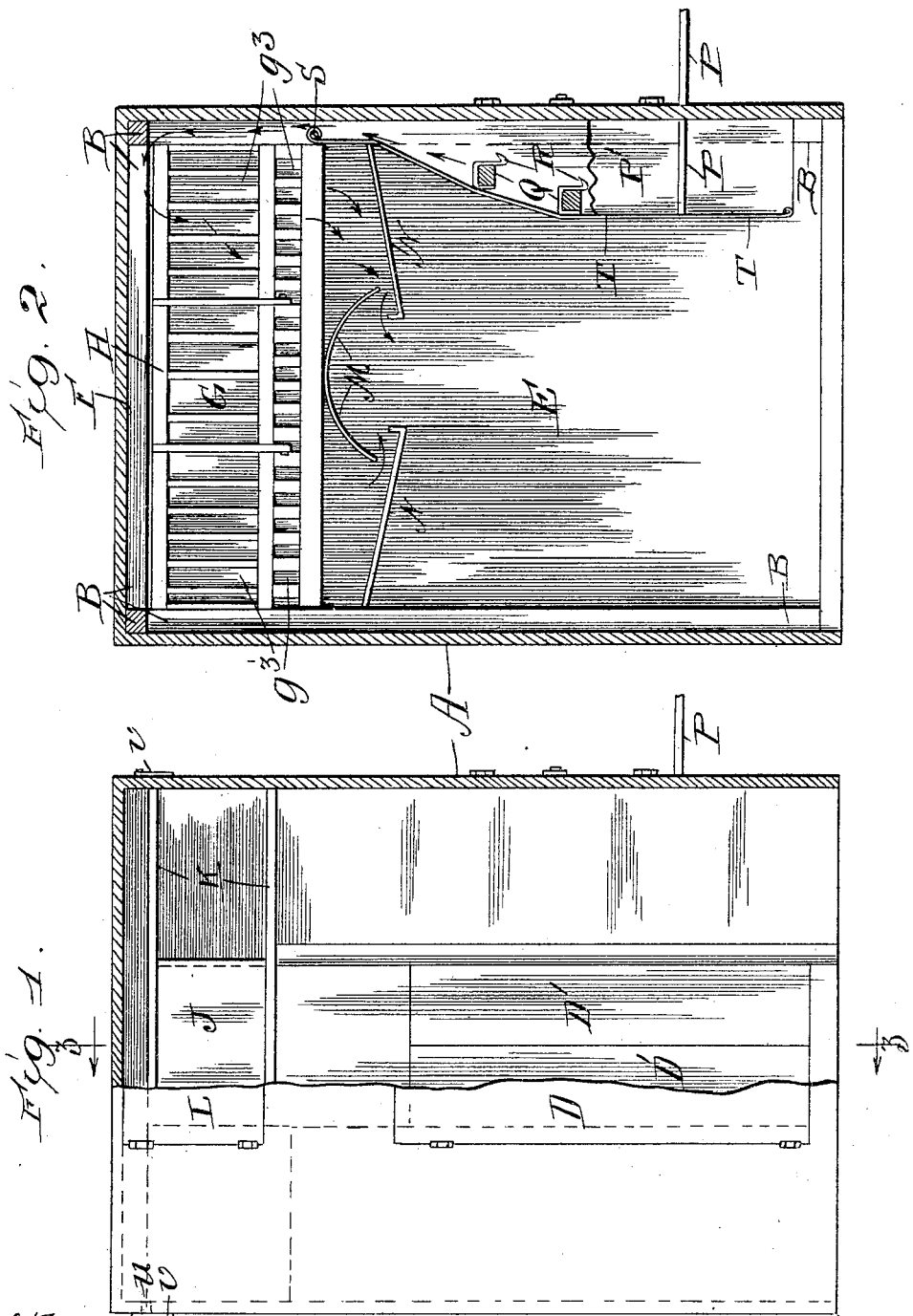

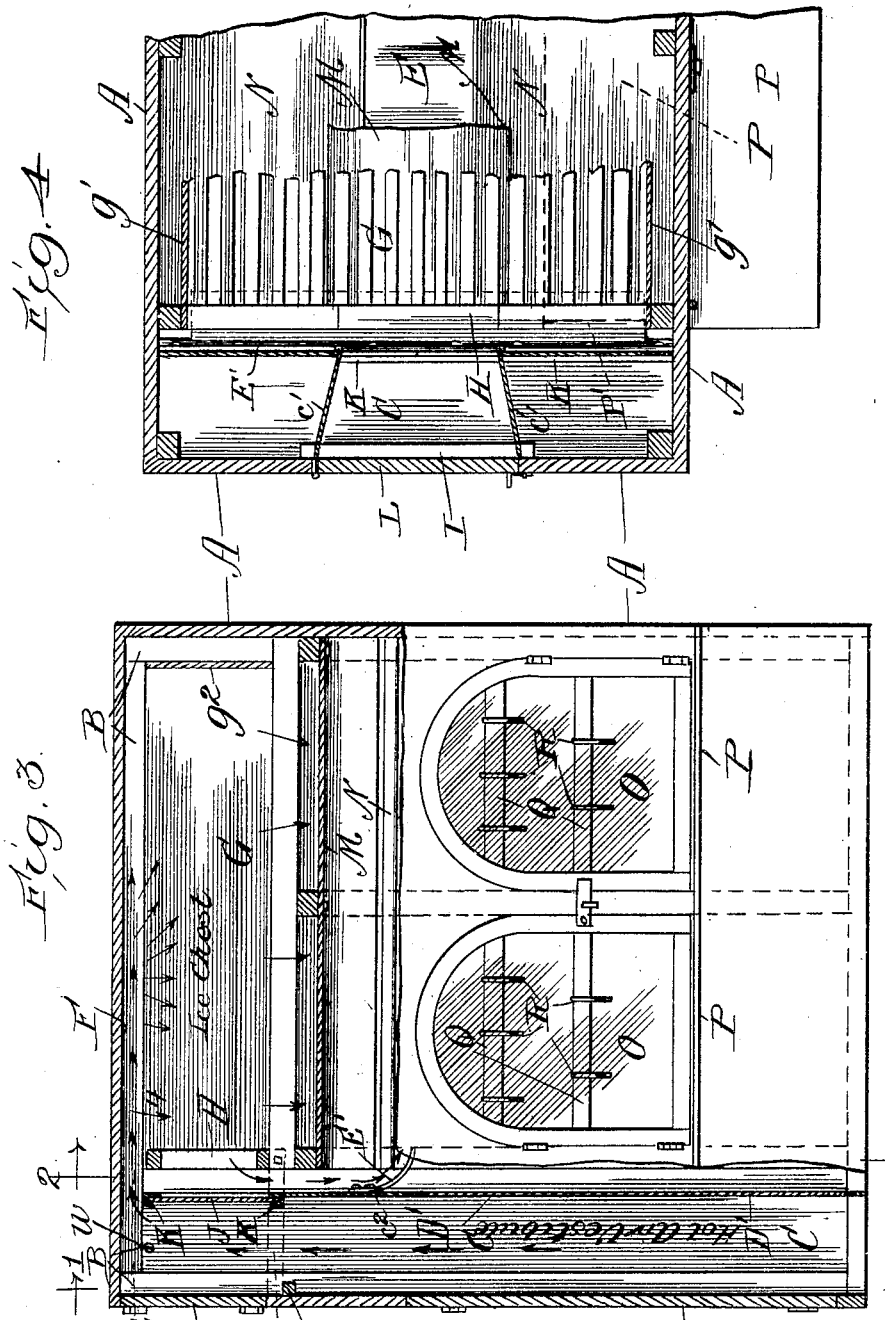

PAUL H. WOLFRAM, OF CHICAGO, ILLINOIS.

ICE-BOX.

No. 810,015.  Specification of Letters Patent.  Patented Jan. 16, 1906.

Application filed July 22, 1904. Serial No. 217,692.

*To all whom it may concern:*

Be it known that I, PAUL H. WOLFRAM, a citizen of the United States, whose residence and post-office address is at No. 509 Tremont street, in the city of Chicago, in the county of Cook and State of Illinois, have invented a certain new and useful Improvement in Ice-Boxes, of which the following is a specification.

My invention relates to that class of ice-boxes which are used in meat-markets for the storage of meats and which are of such size as to permit a person to enter and be inclosed therein.

The object of my invention is to cause the warm air entering through the outside doors to pass through the ice-chest and over the ice therein before it enters the main chamber in which the meat is stored, to cause the air passing from the ice to circulate in said chamber and to be kept fresh by the expulsion of part of the air from the ice-box each time an outside door is closed. The way in which I accomplish these objects is set forth in the following specification and illustrated in the accompanying drawings, in which—

Figure 1 is an end elevation, a part of the wall being broken away, the section being on the line 1 1, Fig. 3. Fig. 2 is a sectional elevation on the line 2 2, Fig. 3, showing the end of the ice-chest, positions of the drip-arch, drip-pans, and partitions back of the front doors inside the main chamber. Fig. 3 is a front elevation, the part in section being on the line 3 3, Fig. 1, showing the vestibule, ice-chest, air-deflector, and the direction of the current of air. Fig. 4 is a sectional plan view on the line 4 4, Fig. 3, showing the relative positions of the vestibule, ice-chest, and the doors leading into the ice-chest.

The walls A of the ice-box and the frame B are made in the usual way. Supported on the walls and frame is a vestibule C, formed by said walls and frame and by the partitions $c'$ and $c^2$. This vestibule is of a size sufficient to easily inclose a large person. The entrance from the outside is by the door D, and the door D' affords entrance from the vestibule to the main chamber E. The vestibule extends vertically to the roof F, except where it is arranged with a sliding door J, over which the air from the vestibule is free to pass into the ice-chest G, as shown by the direction of the arrows in Fig. 3. The ice-chest G is arranged directly under the roof. The sides $g'$ and $g^2$ are inclosed. The bottom and end $g^3$ are of open-work, that permits the free passage of air from the ice-chest into the main chamber E. The inclosed part of the ice-chest is also below the roof F and allows the free passage of the air over the ice. The air entering through the open front doors O is forced by the curtain-partition T to pass upward over the side $g'$ of the ice-chest and through the ice-chest, as shown in Fig. 2, before it can enter the chamber E. In the chamber E, supported on the vestibule-partition $c^2$ above the door D' and extending from front to rear of the chamber E, is a deflector E', Fig. 3, the lower part of which curves under the drip-pans N. Part of the air passing down from the ice-chest strikes this deflector and is thereby caused to circulate in the chamber E. Forming part of the open end of the ice-chest G is a gate H, pivotally supported at the bottom by the floor-bars of the ice-chest, as shown in Fig. 2, and is adapted to be lowered to a horizontal position, as shown by the dotted line in Fig. 3, in which position the top rail of the gate rests on the cleat I. In this position the gate forms a bridge extending from the outside door L into the ice-chest, adapted to facilitate the passage of ice into the ice-chest. Forming part of the partition $c^2$ is a sliding door J, supported in the runways K, said door being adapted to be opened to permit the lowering of the gate H and to be closed when the gate is raised, as shown in Figs. 1 and 4, the top of said runways being some distance below the roof F, as shown in Fig. 3, to allow the free passage of the air from the vestibule into the ice-chest.

In the wall A is a door L in line with the sliding door J and gate H for the admission of ice. Under the ice-chest a drip-arch M and the drip-pans N are arranged to catch the water from the melting ice and to convey it out of the ice-box. Under this arch and these pans is the main chamber E, into which the door D' affords an entrance from the vestibule and into which the front doors O also open. At the bottom of the front doors is a shelf P. This shelf P extends some distance outward from the front doors and also projects into the interior of the chamber E. Above this shelf in the chamber E are several rails Q, adapted to support the hooks R. Supported on a rod S is a curtain T, which extends down over the rails Q and the shelf P and covers the space between the wall A and the partition P' at the left end of the shelf P, forming an inclosure opening at the top over the side $g'$ of the ice-chest into the ice-chest, as shown in Fig. 2. This arrangement prevents the air from entering through the front doorways, passing directly into the chamber E. The curtains T can be raised from the inside of the chamber E for the purpose of stocking the shelf P and meat-hooks R. For changing the air in the chamber E one or more apertures U are made in the walls A near the roof F. These apertures are covered on the outside by the flaps V, which exclude the outside air, but are raised by the air-pressure from within caused by the closing of the doors D or O, and thus allowing part of the air to escape from the ice-box as fresh air is forced in by the opening and closing of the doors.

As these ice-boxes are constructed for certain rooms or spaces, the vestibule and the entrance to the ice-chest may be required to be arranged at either end or in front of the ice-box; but such changes in no wise affect the elements of my improvement.

What I claim, and seek to secure by Letters Patent, is—

1. In an ice-box of the kind described, the combination comprising a main body composed of the walls A, frame B and roof F; an ice-chest G supported on said frame B near the roof F for the storage of ice, said ice-chest having closed sides $g'$ and end $g^2$ and open-work front and bottom $g^3$; a vestibule C formed by the wall A and partitions $c'$ and $c^2$ and provided with an outside door D and inside door D' connecting the vestibule with the main chamber E; the top of said vestibule being open near the roof F and adapted to cause the air entering through the outside doorway to pass upward to the roof F and into said ice-chest, and from there into the main chamber E; a main chamber E inclosed by the walls A and beneath the ice-chest G, said chamber being provided with front doors O and a shelf P, having an end partition P'; rails Q adapted to support meat-hooks R; a curtain-partition T supported on the frame B and extending from the wall A on the one side and over the partition P' on the other from the side $g'$ of the ice-chest G down over the rails Q and shelf P, thereby forming a small inclosure in the chamber E, said inclosure being open at the top and adapted to cause the air entering through the open doors O to pass into the ice-chest G; and a deflector E' suitably supported on the frame B and vestibule C, and extending across the chamber E adapted to receive and deflect part of the air passing downward from the ice-chest G and thereby causing a circulation of air in said chamber; and a plurality of apertures U provided with flaps V, said apertures and flaps being adapted to allow a change of air to take place in said chamber E through the opening and closing of the doors D and O in said ice-box, substantially as described and for the purposes specified.

2. In an ice-box of the kind described, the combination comprising a main body; an ice-chest G suitably arranged near the roof F; a vestibule C arranged within said main body and opening near the roof and over said ice-chest, and having suitable entrances D and D'; a main chamber E arranged to be entered from said vestibule and having front doors O and a shelf P; a movable partition T within said chamber E and inclosing the shelf P and doors O, and adapted to cause the air entering said doors to pass through the ice-chest G before entering the chamber E, and a deflector E' adapted to cause the circulation of the air passing from the ice-chest into the chamber E, substantially as described and for the purposes specified.

3. In an ice-box of the kind described, the combination of a main body A and B; a vestibule C and main chamber E, said vestibule forming the main entrance into said chamber; a front door O opening into said chamber; a shelf P and movable partition T in the interior of the chamber E forming a small inclosure bounded by the partition T, shelf P and front wall and door O, said inclosure being open at the top; and an ice-chest into which said vestibule and said small inclosure open, substantially as described and for the purposes specified.

4. In an ice-box of the kind described, the combination of a main body A and B, a vestibule C and main chamber E separated from said vestibule by a partition $c^2$, with a deflector E', said deflector being attached to said partition and supported thereby and extending from the front to the rear walls of said main chamber, and projecting outward from said partition in a curved form, substantially as described and for the purposes specified.

PAUL H. WOLFRAM.

Witnesses:
 PHILIP H. WOLFRAM,
 JULIUS RUBINSTEIN.